US008135299B2

(12) United States Patent
Peters et al.

(10) Patent No.: US 8,135,299 B2
(45) Date of Patent: Mar. 13, 2012

(54) COMPUTER GENERATED IMAGERY (CGI) FAULT CLEARANCE INSTRUCTIONS (75) Inventors: Anthony John Peters, Shillington (GB); David Michael Phasey, Potters Bar (GB); Michael Peter Golding, Ware (GB); Gemma Rosalind Lee, Benfleet (GB); Leslie Wynn, Letchworth Garden City (GB)

(73) Assignee: Xerox Corporation, Norwalk, CT (US)

( * ) Notice: Subject to any disclaimer, the term of this patent is extended or adjusted under 35 U.S.C. 154(b) by 473 days.

(21) Appl. No.: 12/417,728

(22) Filed: Apr. 3, 2009

(65) Prior Publication Data

US 2010/0257414 A1  Oct. 7, 2010

(51) Int. Cl.
*G03G 15/00* (2006.01)
(52) U.S. Cl. ......................................... 399/81
(58) Field of Classification Search ............... 399/18, 399/8, 81, 21
See application file for complete search history.

(56) References Cited

U.S. PATENT DOCUMENTS

| 6,744,998 | B2 | 6/2004 | McIntyre |
| 6,750,878 | B1* | 6/2004 | Tatsuo et al. ........... 715/705 |
| 6,920,613 | B2 | 7/2005 | Dorsey et al. |
| 7,149,936 | B2 | 12/2006 | Deshpande et al. |
| 7,239,979 | B1 | 7/2007 | McComber et al. |
| 7,403,721 | B2* | 7/2008 | Yamada ................. 399/21 |
| 7,697,850 | B2* | 4/2010 | Mathewson ............ 399/8 |
| 2002/0161804 | A1* | 10/2002 | Chiu et al. ............. 707/530 |
| 2005/0254850 | A1* | 11/2005 | Bardolatzy et al. ..... 399/81 |

FOREIGN PATENT DOCUMENTS

JP  2003237195 A  *  8/2003

OTHER PUBLICATIONS

Computer translation of JP2003-237195A to Ito; Aug. 2003.*

* cited by examiner

*Primary Examiner* — Quana M Grainger
(74) *Attorney, Agent, or Firm* — Maginot, Moore & Beck, LLP (57) ABSTRACT A method of providing instructions to a user of an imaging device includes generating a three-dimensional (3D) model of the imaging device in a 3D computer generated environment. At least one computer generated imagery (CGI) instruction sequence is then rendered from the 3D model. The CGI instruction sequence depicts at least one action being performed on the imaging device and is rendered from a virtual viewpoint corresponding to a viewpoint of a user physically performing the at least one action. The rendered CGI instructions are stored in memory of the imaging device and selectively displayed on a user interface display screen of the imaging device.

11 Claims, 7 Drawing Sheets

COMPUTER GENERATED IMAGERY (CGI) FAULT CLEARANCE INSTRUCTIONS

TECHNICAL FIELD

This disclosure relates generally to imaging devices, and, in particular, to devices and methods for clearing faults in such imaging devices.

BACKGROUND

Imaging devices require a user's active participation in connection with operations. The extent of required participation differs, depending on the type of device. One type of operation involves setup procedures. These can include setting various default conditions, selecting options for a particular job such as paper size or orientation, color calibration steps, entering source or destination information, and various other selections. A different kind of operation that advantageously relies on actions by the user may involve diagnostic and fault recovery procedures, namely identifying, isolating and correcting operational problems, a familiar example being the clearing of paper jams. A third type of operation may concern regular maintenance procedures such as changing supplies of ink, toner or other marking material, cleaning print heads and paper paths, etc.

Help screens have long been employed to provide direction to a user in setting up the device, handling regular maintenance, and responding to faults. Sensed deficiencies in initial condition, and operational faults during printer operation, advantageously generate an alarm and may also present information on the nature and location of the fault to assist the operator in remedying faults, if possible. In some previously known systems, instructions for clearing faults in an imaging device were in the form of text messages indicating the source of the fault and/or one or multiple still images depicting the section of the device in need of attention that were provided, for example, on the exterior surface of the imaging device or on a user interface display screen. Still images were presented to the user comic strip style or presented one after another (e.g., in gif format). While still images may be sufficient for simple faults such as an out-of-paper condition, they may not be adequate for more complicated faults such as a paper jam. Clearing such a fault may require multiple steps such as: opening a door, turning a lever clockwise, pulling out a mechanism, lifting a cover, etc. Such a sequence of steps is difficult for an operator to follow even when multiple still images are provided to illustrate each step because the images do not convey information about the movements required to accomplish the task.

Another approach that has been utilized to provide instructions to an operator is the use of live-action videos depicting an operator interacting with the imaging device in a prescribed manner intended to remediate, or clear, the fault condition. Live-action instructional videos may be effective in assisting an operator in interacting with an imaging device. However, in considering the use of live-action footage for directing users in interacting with an imaging device, a number of issues were found that made the use of live-action videos unwieldy and expensive. For example, the production of live-action videos may be expensive due to the multiple people, e.g. actors, camera people, etc., the use of a particular locale, pre-production tasks such as story-boarding, filming the video, post-production tasks such as editing, that are involved. In addition, as an iterative process, where instruction is story-boarded, a sequence is produced, implemented and then validated in usability testing, changes are likely to be made to an instruction after the initial delivery—to refine and enhance the clarity of the instruction based on user feedback. The use of live action video would require that the entire instruction be recreated in order to account for changes in fault clearance methodology. In addition, there are many details of imaging device operation that are not easily captured in a live-action video, such as the way baffles snap open, or crash down, renditions of media, such as paper, and how it crumples, for example. Thus, live-action videos may still have to undergo significant editing after the video has been captured to add graphical overlays and the like to the videos so that a user can understand what's going on the video and be able to follow its instructions.

SUMMARY

As an alternative to using still images or live-action video for providing instructions to a user of imaging device, the present disclosure proposes the use of computer generated imagery (CGI) instructions for guiding a user's interactions with an imaging device. In one embodiment, a method of providing instructions to a user of an imaging device includes generating a three-dimensional (3D) model of the imaging device in a 3D computer generated environment. At least one computer generated imagery (CGI) instruction sequence is then rendered from the 3D model. The CGI instruction sequence depicts at least one action being performed on the imaging device and is rendered from a virtual viewpoint corresponding to a viewpoint of a user physically performing the at least one action. The rendered CGI instructions are stored in memory of the imaging device and selectively displayed on a user interface display screen of the imaging device.

In another embodiment, a fault management system for use with an imaging device s provided. The fault management system includes a memory and a plurality of computer generated imagery (CGI) instruction sequences stored in the memory. Each CGI instruction sequence is rendered from a 3D model of an imaging device defined in a 3D computer generated environment and depicts at least one action being performed on the imaging device. Each CGI instruction sequence is rendered from a virtual viewpoint in the 3D environment corresponding to a viewpoint of a user physically performing the corresponding action. The system also includes a user interface display screen operably coupled to the memory and configured to selectively display the plurality of CGI instruction sequences.

In yet another embodiment, a method of operating an imaging device is provided. The method comprises detecting a fault condition in an imaging device; and displaying at least one CGI instruction sequence on a display screen in response to the detection of the fault condition. Each CGI instruction sequence is rendered from a 3D model of an imaging device defined in a 3D computer generated environment and depicts at least one action being performed on the imaging device. Each CGI instruction sequence is rendered from a virtual viewpoint in the 3D environment corresponding to a viewpoint of a user physically performing the corresponding action.

BRIEF DESCRIPTION OF THE DRAWINGS

The foregoing aspects and other features of the present disclosure are explained in the following description, taken in connection with the accompanying drawings, wherein.

DETAILED DESCRIPTION

For a general understanding of the present embodiments, reference is made to the drawings. In the drawings, like reference numerals have been used throughout to designate like elements.

As used herein, the terms "printer" or "imaging device" generally refer to a device for applying an image to print media and may encompass any apparatus, such as a digital copier, bookmaking machine, facsimile machine, multi-function machine, etc. which performs a print outputting function for any purpose. "Print media" can be a usually flimsy physical sheet of paper, plastic, or other suitable physical print media substrate for images. A "print job" or "document" is normally a set of related sheets, usually one or more collated copy sets copied from a set of original print job sheets or electronic document page images, from a particular user, or otherwise related. As used herein, the term "consumable" refers to anything that is used or consumed by an imaging device during operations, such as print media, marking material, cleaning fluid, and the like. An image generally may include information in electronic form which is to be rendered on the print media by the image forming device and may include text, graphics, pictures, and the like. The operation of applying images to print media, for example, graphics, text, photographs, etc., is generally referred to herein as printing or marking.

As used herein an "action" generally refers to an individual occurrence in which a user interacts with a device by performing a mechanical operation, e.g., opening a door of the printer or manipulating, e.g., pulling out, a component of the printer. In general, actions are the smallest operations which can be recognized by the printer. Actions which may be recorded by the printer include those which are associated with a recovery event and those which are associated with normal operation of the printer. A "recovery action" refers to any action of a user associated with a printer with the object of clearing or preventing a fault with the imaging device. Exemplary user recovery actions in troubleshooting include opening access panels to paper trays, removing and/or replacing components such as toner cartridges, adjusting components, removing trapped paper, and the like. The recovery actions may take place in response to a printer request or may be user initiated.

As used herein a replaceable module or "customer replaceable unit" (CRU) can be any component of a printer which has an expected lifetime, until repair or replacement, which is shorter than the expected or actual lifetime of the printer in which it is to be used, or which has a designated lifetime. Generally, CRUs are self-contained, modular units which are easily replaced by a customer, often by simply removing the old CRU and plugging in a new one in the same location. Exemplary CRUs include imaging units and fuser units, although CRUs are not limited to these components and may include other components of a printer or even a subcomponent of a CRU, such as feed roll cartridges, fuser webs, stripper fingers, toner cartridges, developer housings, ozone filters, hole punch heads in the finisher, and the like.

Figure 1:
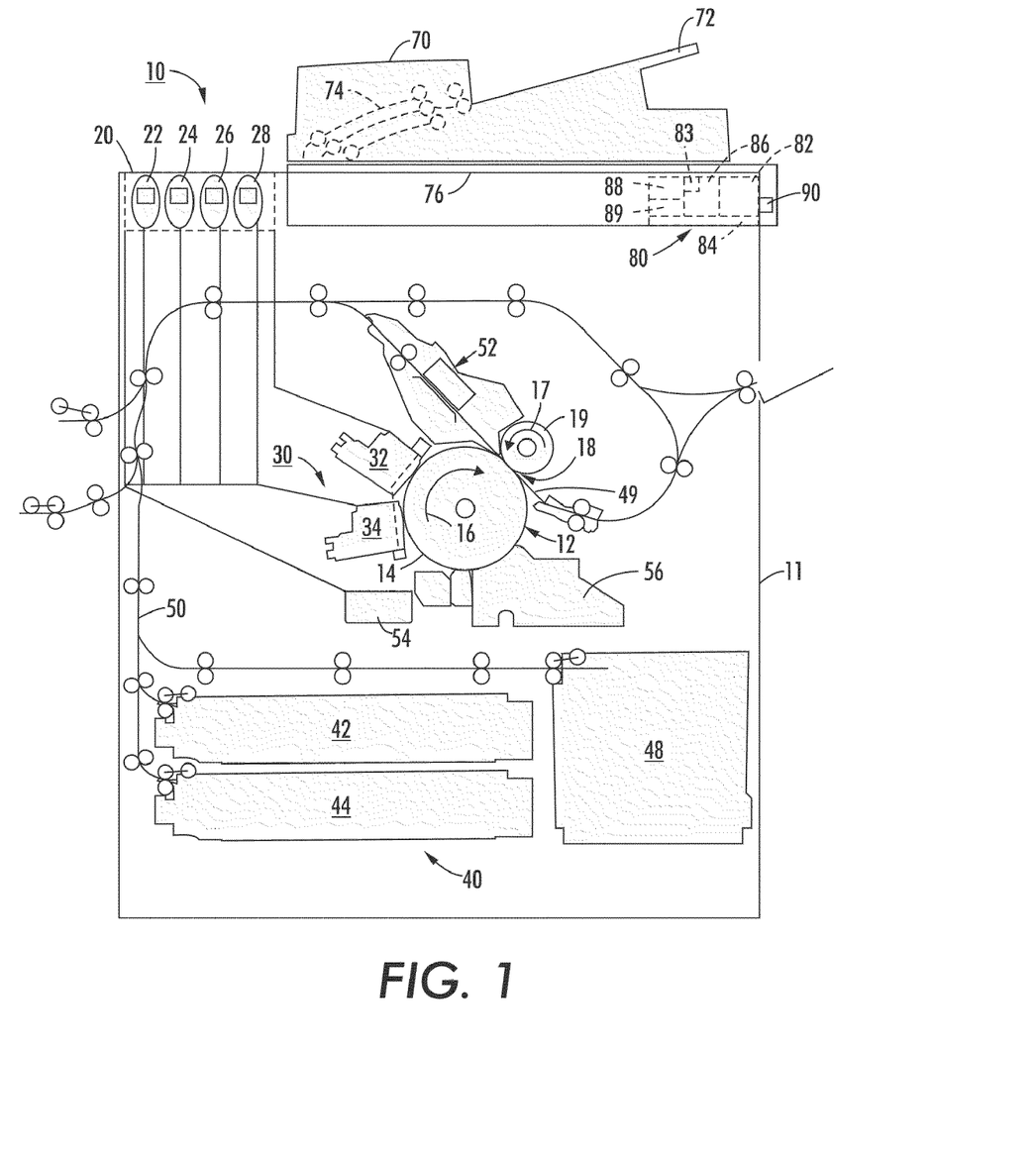
FIG. 1 is a schematic diagram of an embodiment of an ink jet printing apparatus.

Referring now to FIG. 1, an embodiment of an imaging device 10 of the present disclosure, is depicted. As illustrated, the device 10 includes a frame 11 to which are mounted directly or indirectly all its operating subsystems and components, as described below. In the embodiment of FIG. 1, imaging device 10 is an indirect marking device that includes an intermediate imaging member 12 that is shown in the form of a drum, but can equally be in the form of a supported endless belt. The imaging member 12 has an image receiving surface 14 that is movable in the direction 16, and on which phase change ink images are formed. A heated transfix roller 19 rotatable in the direction 17 is loaded against the surface 14 of drum 12 to form a transfix nip 18, within which ink images formed on the surface 14 are transfixed onto a media sheet 49. In alternative embodiments, the imaging device may be a direct marking device in which the ink images are formed directly onto a receiving substrate such as a media sheet or a continuous web of media.

The imaging device 10 also includes an ink delivery subsystem 20 that has at least one source 22 of one color of ink. Since the imaging device 10 is a multicolor image producing machine, the ink delivery system 20 includes four (4) sources 22, 24, 26, 28, representing four (4) different colors CYMK (cyan, yellow, magenta, black) of ink. The ink delivery system is configured to supply ink in liquid form to a printhead system 30 including at least one printhead assembly 32. Since the imaging device 10 is a high-speed, or high throughput, multicolor device, the printhead system 30 includes multicolor ink printhead assemblies and a plural number (e.g. four (4)) of separate printhead assemblies (32, 34 shown in FIG. 1).

In one embodiment, the ink utilized in the imaging device 10 is a "phase-change ink," by which is meant that the ink is substantially solid at room temperature and substantially liquid when heated to a phase change ink melting temperature for jetting onto an imaging receiving surface. Accordingly, the ink delivery system includes a phase change ink melting and control apparatus (not shown) for melting or phase changing the solid form of the phase change ink into a liquid form. The phase change ink melting temperature may be any temperature that is capable of melting solid phase change ink into liquid or molten form. In one embodiment, the phase change ink melting temperate is approximately 100° C. to 140° C. In alternative embodiments, however, any suitable marking material or ink may be used including, for example, aqueous ink, oil-based ink, UV curable ink, or the like.

As further shown, the imaging device 10 includes a media supply and handling system 40. The media supply and handling system 40, for example, may include sheet or substrate supply sources 42, 44, 48, of which supply source 48, for example, is a high capacity paper supply or feeder for storing and supplying image receiving substrates in the form of cut sheets 49, for example. The substrate supply and handling system 40 also includes a substrate or sheet heater or preheater assembly 52. The imaging device 10 as shown may also include an original document feeder 70 that has a document holding tray 72, document sheet feeding and retrieval devices 74, and a document exposure and scanning system 76.

Operation and control of the various subsystems, components and functions of the machine or printer 10 are performed with the aid of a controller or electronic subsystem (ESS) 80. The ESS or controller 80 for example is a self-contained, dedicated mini-computer having a central processor unit (CPU) 82, electronic storage 84, and a display or user interface (UI) 86. The ESS or controller 80 for example includes a sensor input and control system 88 as well as a pixel placement and control system 89. In addition the CPU 82 reads, captures, prepares and manages the image data flow between image input sources such as the scanning system 76, or an online or a work station connection 90, and the printhead assemblies 32, 34, 36, 38. As such, the ESS or controller 80 is the main multi-tasking processor for operating and controlling all of the other machine subsystems and functions, including the printhead cleaning apparatus and method discussed below.

In operation, image data for an image to be produced are sent to the controller 80 from either the scanning system 76 or via the online or work station connection 90 for processing and output to the printhead assemblies 32, 34, 36, 38. Additionally, the controller determines and/or accepts related subsystem and component controls, for example, from operator inputs via the user interface 86, and accordingly executes such controls. As a result, appropriate color solid forms of phase change ink are melted and delivered to the printhead assemblies. Additionally, pixel placement control is exercised relative to the imaging surface 14 thus forming desired images per such image data, and receiving substrates are supplied by any one of the sources 42, 44, 48 along supply path 50 in timed registration with image formation on the surface 14. Finally, the image is transferred from the surface 14 and fixedly fused to the copy sheet within the transfix nip 18.

To facilitate transfer of an ink image from the drum to a recording medium, a drum maintenance system 56, also referred to as a drum maintenance unit (DMU), is provided to apply release agent to the surface 12 of the print drum 16 before ink is ejected onto the print drum. Release agent is typically silicone oil that is applied to the print drum by an applicator roll (not shown) in the drum maintenance system that may be partially submerged in a release agent sump. A blade (not shown) may be positioned at a location following the drum maintenance system to remove excess release agent from the print drum. The release agent provides a thin layer on which an image is formed so the image does not adhere to the print drum. In one embodiment, the drum maintenance system 56 comprises a CRU, and, therefore, is configured for insertion into and removal from the imaging device as a self-contained unit.

In various modes of operation, ink may be purged from the printheads to ensure proper operation of the printhead. When ink is purged through the printhead, the ink flows down and off the front face of the printhead. Commonly, during a cleaning cycle, a scraper or wiper blade (not shown) may also be drawn across the ink ejecting front face of the printhead to squeegee away any excess liquid phase ink that may collect there. The waste ink wiped-off or otherwise removed from the face of the printhead (typically, still in liquid from) is caught by a gutter, for example, which channels or otherwise directs it toward a removable waste ink collection container 54 where, e.g., it is allowed to cool and re-solidify. Suitably, the waste ink collection container 54 is positioned in a location conveniently accessible, e.g., at or near the outside of the main housing 11 of the device 10. Accordingly, when full, the container 54 is readily removed for disposal of the waste ink from the container. Alternately, the full container 54 may simply be disposed of and replaced with a new empty container.

As mentioned, imaging devices, such as the one described above, may be subject to various faults which impact system operation. The term "fault" refers to an abnormal condition or defect at the component equipment, or sub-system level which may lead to a failure, an accidental condition that causes a electronic system or portion thereof to fail to perform its intended function or a defect that causes a reproducible malfunction (i.e., a malfunction that occurs reproducibly under the same conditions). For example, fault conditions that may occur in the imaging device of FIG. 1 include media jams at various locations in the substrate supply and handling system, consumable depletion (e.g, media, solid ink sticks), CRU's (e.g., drum maintenance unit) requiring replacement, waste ink tray being full, access panels being open, and the like.

Figure 2:
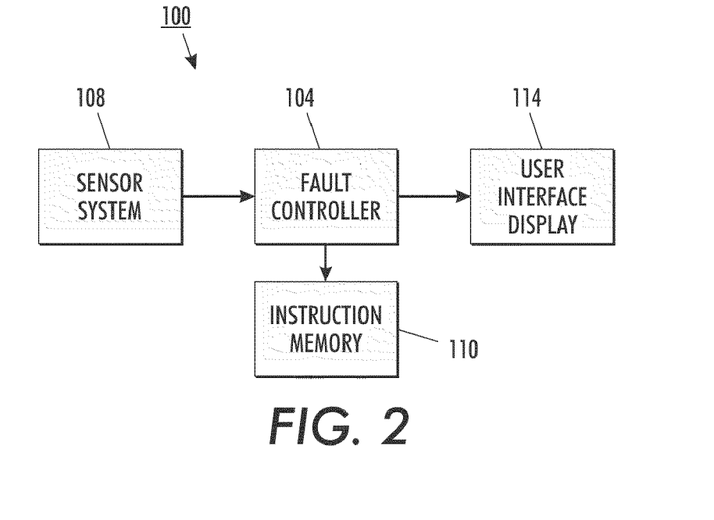
FIG. 2 is a block diagram of the fault management system of FIG. 1.

Referring now to FIG. 2, in order to detect and identify the location and nature of fault conditions within the imaging device, the imaging device includes a fault management system 100 that includes a fault controller 104, a sensor system 108, a memory 110 and a user interface display 114. The fault controller may be implemented as a subsystem of the system controller 80. The fault management system includes a sensor system 108 that includes a plurality of sensors and devices that generate signals that are output to the fault controller that are indicative of the status of a device component, the presence or absence of a media at a particular location in the device at a certain time, the available media in a media supply source, the available ink in an ink supply source, and the like. Based on the signals received from the sensor system, the fault controller 104 can identify one or more fault conditions and/or fault codes in the imaging device. For example, each fault condition may have a pre-assigned or predetermined "fault code." Fault codes, however, may take any format that is capable of conveying meaning to the fault controller or operator of the device. In one approach, fault codes are alpha-numeric character strings wherein particular characters or groups of characters in the string may be associated with particular locations, error conditions, replacement components, etc. of an imaging device.

Once a fault code is identified, the fault controller 104 is configured to actuate the user interface 114 to display fault clearance instructions to assist or guide an operator in interacting with an imaging device to clear fault conditions, e.g., reload consumables, replace CRUS's, remove jammed paper from the media supply and handling system, close doors, etc. In some previously known systems, instructions for clearing faults in an imaging device were in the form of text messages indicating the source of the fault and/or one or multiple still images depicting the section of the device in need of attention that were provided, for example, on the exterior surface of the imaging device or on a user interface display screen. Still images were presented to the user comic strip style or presented one after another (e.g., in gif format). While still images may be sufficient for simple faults such as an out-of-paper condition, they may not be adequate for more complicated faults such as a paper jam in the substrate supply and handling system 50 of an imaging device, such as the device of FIG. 1. Clearing such a fault may require multiple steps such as: opening a door, turning a lever clockwise, pulling out a mechanism, lifting a cover, etc. Such a sequence of steps is difficult for an operator to follow even when multiple still images are provided to illustrate each step because the images do not convey information about the movements required to accomplish the task.

Another approach that has been utilized to provide fault clearing instructions to an operator is the use of live-action videos depicting an operator interacting with the imaging device in a prescribed manner intended to remediate, or clear, the fault condition. Live-action instructional videos may be effective in assisting an operator in interacting with an imaging device. However, in considering the use of live-action footage for directing users in interacting with an imaging device, a number of issues were found that made the use of live-action videos unwieldy and expensive. For example, the production of live-action videos may be expensive due to the multiple people, e.g. actors, camera people, etc., the use of a particular locale, pre-production tasks such as story-boarding, filming the video, post-production tasks such as editing, that are involved. In addition, as an iterative process, where instruction is story-boarded, a sequence is produced, implemented and then validated in usability testing, changes are likely to be made to an instruction after the initial delivery—to refine and enhance the clarity of the instruction based on user feedback. The use of live action video would require that the entire instruction be recreated in order to account for changes in fault clearance methodology. In addition, there are many details of imaging device operation that are not easily captured in a live-action video, such as the way baffles snap open, or crash down, renditions of media, such as paper, and how it crumples, for example. Thus, live-action videos may still have to undergo significant editing after the video has been captured to add graphical overlays and the like to the videos so that a user can understand what's going on the video and be able to follow its instructions.

As an alternative or in addition to the use of text based instructions, cartoons, and still frame images to guide a user in interacting with the imaging device, the present disclosure proposes fault clearance instructions implemented using three-dimensional (3D) computer graphics, also known as computer generated imagery (CGI). CGI is the application of the field of computer graphics or, more specifically, 3D computer graphics to special effects in films, television programs, commercials, simulators and simulation generally. CGI fault clearance instructions depict recovery actions, such as access panels opening, removal and replacement of components (e.g., CRU's), loading of consumables, removal of jammed paper, and the like, that may be displayed on the user interface display screen. CGI instruction sequences may be displayed in response to the detection of a fault or impending fault condition in the imaging device or may be initiated in response to a user request through the user interface.

The use of CGI instruction sequences to guide a user's interactions with an imaging device has numerous advantages over previously known systems. For example, CGI instructions may be depicted from a viewpoint that corresponds to the approximate point of view a user would have in physically performing the recovery action depicted in the instruction. In one embodiment, the viewpoint in each CGI instruction sequence starts from a user's perspective at the front of the device, for example, and moves as a user's point of view would move, panning around the imaging device to particular locations, focusing on specific tasks, and zooming in to specific features, thus guiding a user's attention as if the user was performing the action themselves. To improve the clarity of the actions depicted in a CGI instruction, extraneous detail may be removed or deemphasized. For example, CGI instructions may depict the manipulation of imaging device levers, doors, components, consumables, and the like, without depicting a user actually performing the manipulation which may decrease the clarity or interfere with the view of a particular action. Similarly, CGI instructions may be tailored for use with a specific imaging device configuration so that the instructions display only the parts and components of the imaging device that a user actually has.

To further enhance the clarity of a CGI instruction, movement of the imaging device components, parts, consumables, CRU's, and the like, may be characterized using motion blur effects. Motion blur is the apparent streaking of rapidly moving objects in a still image or a sequence of images that is caused by, for example, a camera shutter remaining open for a period of time and the integration of the movement of objects in the image(s) over that period of time. In CGI, motion blur effects may used to simulate the visual effect of motion so that images or sequences of images appear as if they were conventionally photographed or filmed. Any of a number of methods may be utilized to incorporate motion blur effects into a CGI instruction. For example, motion blur effects may be created by evaluating the positions of all of the objects in an image at slightly different times and then combining and rendering the results. To control the degree of motion blur, time intervals between images in a sequence may be specified that is analogous to the exposure time of a conventional camera.

Another advantage of the use of CGI for fault clearance instructions is that CGI may be used to depict information that is not readily observable in the real world, such as the way baffles snap open, or crash down, renditions of media, such as paper, and how it crumples, for example. In addition, CGI enables the incorporation of visual indicators into an instruction to, for example, direct a user's attention to an area of interest such as a component or part of an imaging device as well as to indicate a direction of motion of a moving part. For example, visual indicators in the form of arrows may be used to indicate required user actions, such as turning levers, or moving latches, and ultimately, removing jammed sheets. Arrows may be used to indicate components, such as CRU's, that need to be removed from the machine (and the actions necessary to empty or replace the unit). In the case of the DMU (drum maintenance unit), for example, where there are specific concerns over the silicone oil content of the unit, the demonstrated care of the unit, potentially imparts to the user the best handling practices (like keeping upright, placing straight into a box) for the task. Similarly, highlighting, such as by changing the color or shade, of an imaging device component, consumable, moving part, and the like, may be utilized to direct and focus a user's attention. Visual indicators may take substantially any format that is capable of enhancing the ability of the instruction in directing a user's attention or guiding a user's action.

Figure 5:
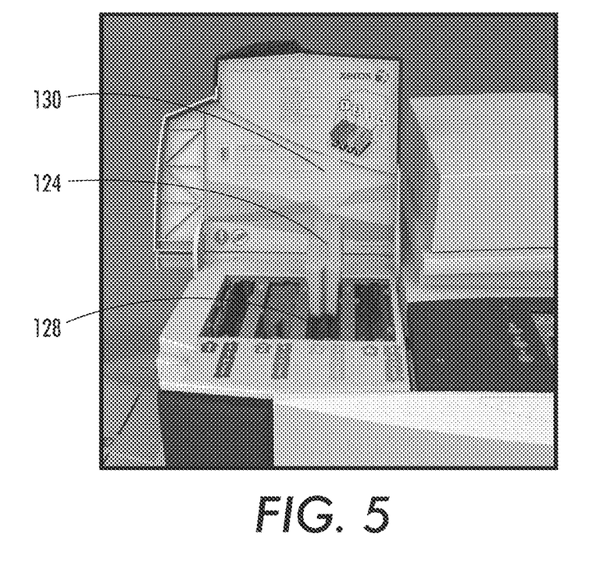
FIG. 5 is a still image from a CGI instruction for loading a yellow ink stick into the imaging device of FIG. 1.
Figure 6:
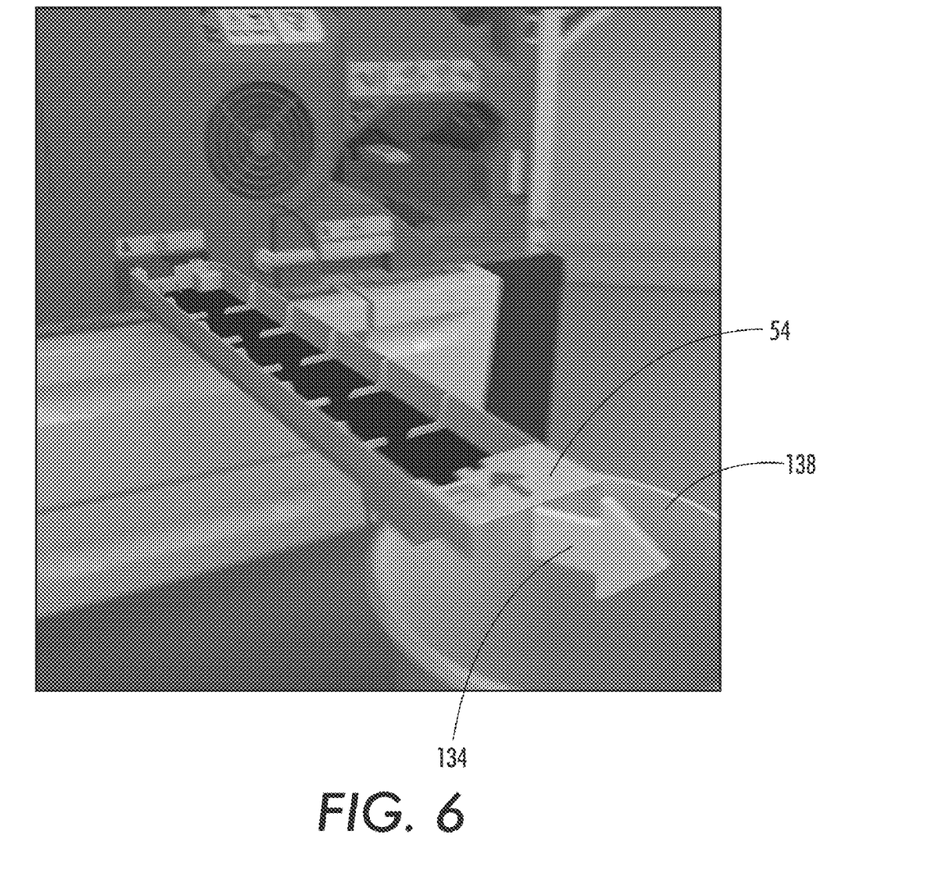
FIG. 6 is a still image from a CGI instruction for handling a waste ink tray of the imaging device of FIG. 1.

FIGS. 4-8 depict still images from exemplary CGI instructions that may be utilized in an imaging device, such as the imaging device of FIG. 1. In particular, FIGS. 4A-C are stills from a CGI instruction for removing a media sheet from a particular location in the imaging device. As depicted in FIG. 4A, the virtual viewpoint begins from a perspective at the front of the device 10 that a user might have upon approach to the device. The virtual viewpoint is then panned and zoomed in subsequent frames until it is focused an area of interest which in this case corresponds to a media jam location as depicted in FIG. 4B. FIG. 4C is a still from the instruction that shows the removal of the jammed media 62 from the jam location. A visual indicator in the form of an arrow 120 is used to indicate the direction of removal of the jammed sheet from the jam location. FIG. 5 is a still image from a CGI instruction for inserting a yellow ink stick 124 into the imaging device 10. Although not depicted, the CGI instruction for inserting a yellow ink stick into the imaging device may begin with a viewpoint of the imaging device such as depicted in FIG. 4A, and continue by showing, for example, a change ink in viewpoint to the ink stick insertion area, the access panel to the ink stick insertion area opening, and a yellow ink stick being removed from its packaging. As seen in FIG. 5, the CGI instruction depicts the correct insertion opening 128 through which yellow ink sticks are inserted as well as the correct orientation and direction of insertion (indicated by arrow 130). FIG. 6 is a still image from a CGI instruction for removing and emptying the waste ink tray 54 (FIG. 1) that shows the direction of removal (indicated by arrow 134) as well as a container 138 into which the waste ink may be emptied.

Figure 7:
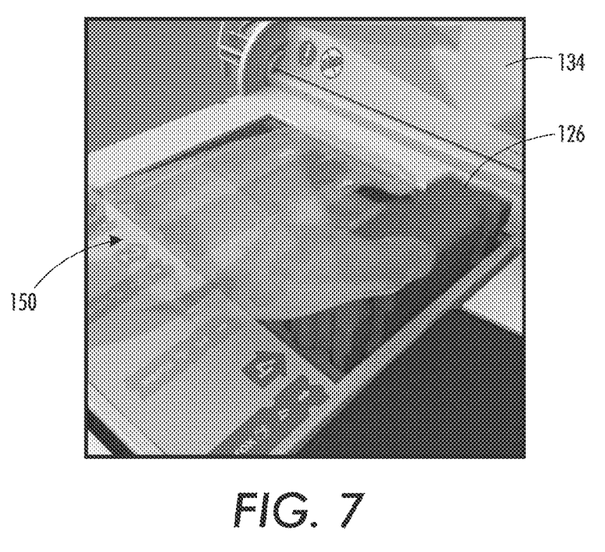
FIG. 7 is a still image from a CGI instruction for loading a black ink stick depicting a CGI hand performing the loading.
Figure 8:
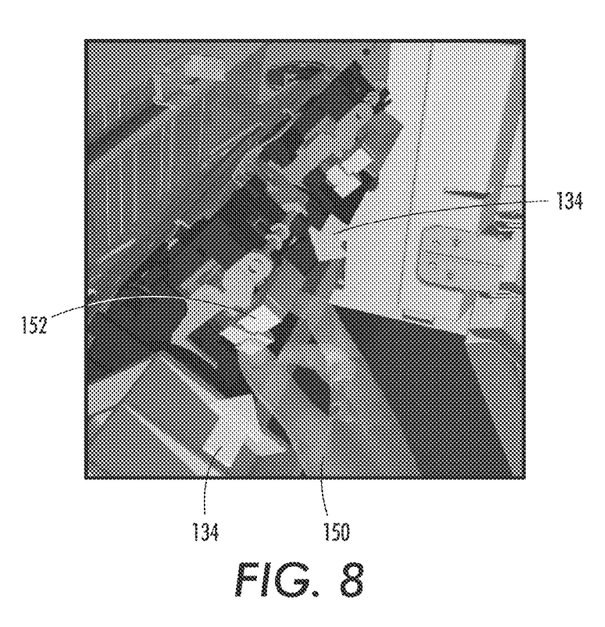
FIG. 8 is a still image from a CGI instruction showing a CGI hand removing and replacing a staple cartridge.

In addition to the use of visual indicators, such as arrows and selective highlighting, the present disclosure also proposes the use of computer generated imagery (CGI) hands in the fault clearance instructions. CGI hands comprise computer generated or rendered images of a virtual hand that performs or mimics a users actions in a CGI instruction such as, opening doors, loading of consumables, turning levers, removing jammed sheets, and the like, that the user can then mimic, the most natural form of instruction possible, as if the user were watching a demonstration from another person. The use of CGI hands offers users the chance to pick up on subtle movements that are required to complete tasks easily in areas with limited space constraints that may not otherwise be possible using live-action video. In addition, CGI hands may be rendered so as to be substantially transparent so as not to obstruct the view of the action being performed. The coloring and/or shape of CGI hands may be selected so as to be gender and race neutral. FIGS. 7 and 8 are still images from exemplary CGI clearance instructions that show CGI hands 150. FIG. 7 is a still image of an instruction for loading black ink into an imaging device and shows a CGI hand 150 in the act of inserting a black ink stick into the appropriate black ink stick opening. As can be seen in FIG. 7, the CGI hand is substantially transparent so that it does not interfere with the view of the insertion openings or ink stick. FIG. 8 is a CGI instruction for removal/replacement of staples in a finishing system of the imaging device and shows a CGI hand 150 in the act of grasping and squeezing a staple cartridge 152. As depicted in FIGS. 7 and 8, CGI hands may be used in conjunction with other virtual indicators such as arrows 134 to further enhance the clarity of the actions to be performed. For example, the arrows 134 of FIG. 8 demonstrate the squeezing action required to release the staple cartridge from its slot in the device.

Figure 3:
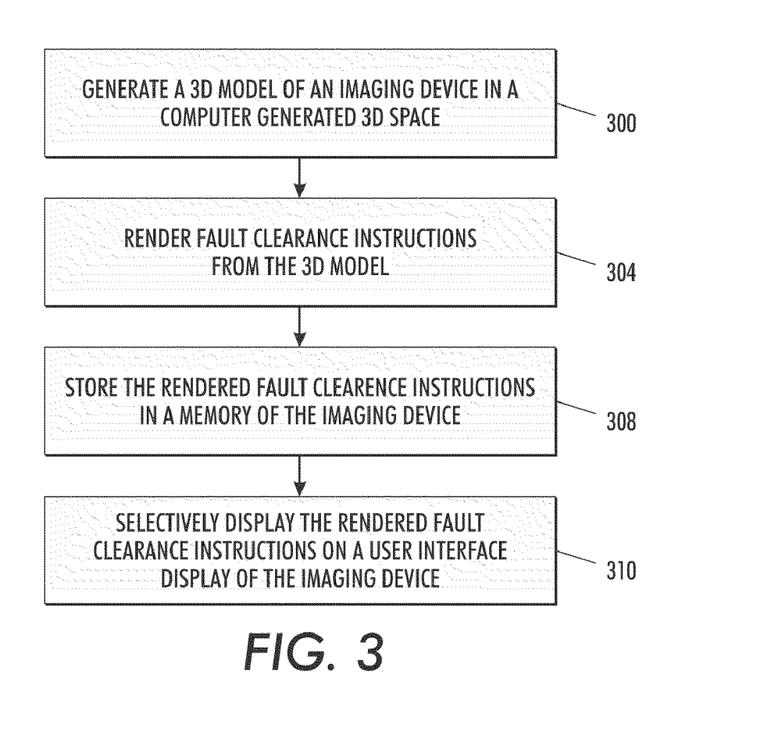
FIG. 3 is a flowchart of a method of generating CGI fault clearance instructions for the fault management system of FIG. 2.
Figure 4A:
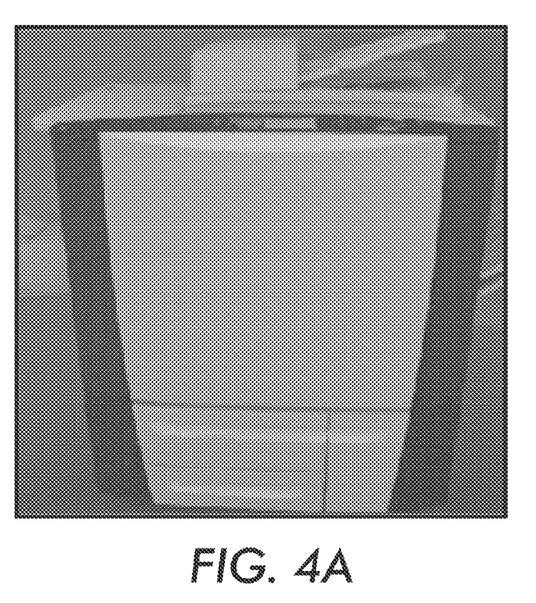
FIGS. 4A-C are still images from a CGI instruction for removing jammed media from an imaging device.
Figure 4B:
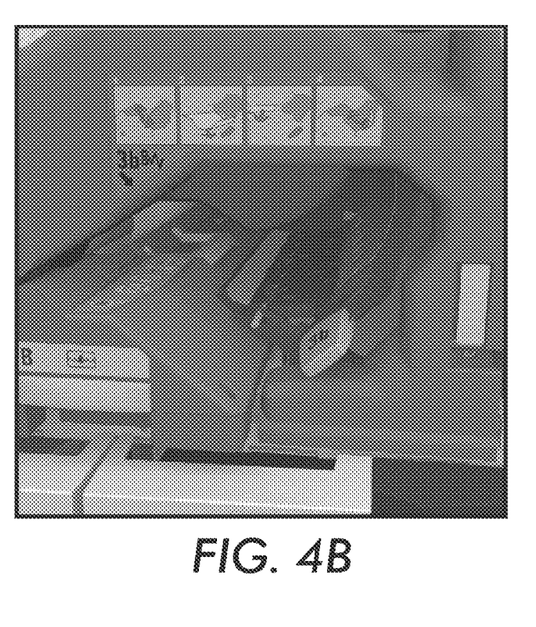
Figure 4C:
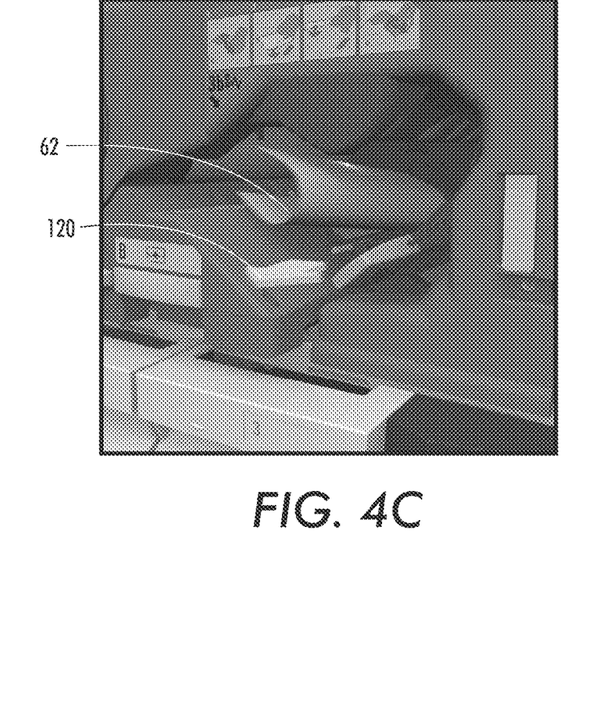

FIG. 3 depicts an embodiment of a method of generating or developing CGI fault clearance instructions for use with an imaging device, such as the imaging device of FIG. 1. The method begins with the generation of a three-dimensional (3D) model of the imaging device in a 3D computer generated environment, also referred to as a 3D space (block 300). As used herein, a 3D model comprises data that describes a three-dimensional object, e.g., imaging device 10, with reference to the 3D space. A 3D model of the imaging device may be generated in any suitable manner. For example, 3D models may be generated using any known or as yet undeveloped 3D modeling software. Several techniques are known for creating a model using software applications. Such techniques include, but are not limited to: combining primitives, extruding, lofting, box modeling, facet modeling, constructive solid geometry, parametric based modeling and combinations thereof.

Once the 3D model of the imaging has been developed, CGI instructions may be generated using the model. Each CGI instruction comprises a sequence of computer generated images, also referred to as frames. The 3D model of the imaging device is translated into a sequence of computer generated frames using a process known as rendering (block 304). Rendering may be performed using a suitable rendering software and/or hardware package, and involves translating the three-dimensional data that describes the imaging device in the 3D computer space into a form that can be displayed in a two-dimensional display device such as user interface display screen. CGI instructions may be rendered into any desired machine-readable format that is capable of being displayed on the display screen. The sequence of rendered frames of a CGI instruction is configured for display at a predetermined frame rate, e.g., frames per second. To give the viewer an impression of smooth, continuous motion, CGI instruction frames may be displayed at a frame rate of at least 25 frames per second although any suitable frame rate may be used.

During rendering, parameters such as lighting effects, shade, color, surface textures, perspective and other visual elements, are defined in order to create a convincingly "3D" image on the flat display screen. In addition, each frame in a CGI instruction is rendered from a predetermined virtual viewpoint as defined in the 3D model space. As mentioned, the virtual viewpoint in a CGI instruction may correspond to a viewpoint that a user may have in physically performing an action depicted in an instruction. Thus, the virtual viewpoint may be assigned a path of motion from frame to frame to simulate a user's point of view. Also, depending on the condition that a particular CGI instruction is intended to address, paths of motion for imaging device components, such as switches, levers, doors, CRU's, etc., may be specified from frame to frame during the rendering process to demonstrate actions that are to be performed by a user.

Some CGI instructions may require the addition of 3D objects to the 3D model that are external to or separate from the 3D model of the imaging device. For example, CGI instructions may depict the handling, loading, and/or removal of CRU's and consumables. In such CGI instructions, 3D objects corresponding to consumable items or CRU's may be added to the 3D model prior to or during the rendering process for the instructions and paths of motion from frame to frame may be defined for the objects that depict, for example, how to correctly load media or ink sticks into the imaging device and how to remove and replace a CRU. In addition to consumable and/or CRU objects, objects corresponding to visual indicators, such as arrows, CGI hands, and their respective paths of movement, may be defined for certain frames or sequences of frames to indicate the required user actions, like turning levers, moving latches, direction of insertion or removal of CRU's, direction and orientation for inserting consumables, etc.

A plurality of CGI instructions may be rendered in this manner from the 3d model of the imaging device with each CGI instruction depicting one or more actions to be taken by a user to address a particular fault condition. In one embodiment, each CGI instruction is assigned to correspond to one or more fault codes and is configured for playback on the display screen in response to the detection of the fault code. More than one CGI instruction may be associated with a particular fault code with each CGI instruction for the fault code being prioritized for playback based on, for example, prior success rates or user feedback. Once one or more CGI instructions have been rendered from the 3D model, the CGI instructions may be stored in a memory 110 (FIG. 2) associated with the imaging device (block 308). The memory may be implemented using any appropriate combination of alterable, volatile or non-volatile memory or non-alterable, or fixed, memory, and may be internally and/or externally located with respect to the imaging device. In one embodiment, CGI instructions may be stored in the memory in an instruction database. Each CGI instruction may be stored in the instruction database in association with at least one fault code. The fault codes may be used as a lookup key for accessing the instruction database to retrieve one or more CGI instructions stored in association with each fault code.

A user interface display screen 114 (FIG. 2) is then configured to selectively display the stored CGI instructions (block 310) to assist or guide an operator in interacting with an imaging device to, for example, open or close doors, remove or replace CRU's, load consumables, and otherwise use the device. CGI instructions may be displayed in response to the detection and identification of fault conditions or fault codes in the imaging device. CGI instructions may also be displayed in response to requests made via controls on the user interface. Referring to FIG. 2, display device 114 may be any suitable type of display device capable of displaying CGI instructions. For example, display device 114 may be a liquid crystal display (LCD) panel, a thin film transistor liquid crystal display (TFT LCD) panel, a plasma display panel (PDP), a field emission display (FED) panel, a surface-conduction electron-emitter display (SED) panel, a touch screen display panel, a cathode ray tube (CRT) display panel, an organic light-emitting diode (OLED) display panel and/or any combination thereof. The display device includes any necessary hardware or software that enables the display device to play the retrieved fault clearance instruction at the predetermined frame rate and in accordance with any other desired viewing preferences.

Figure 9:
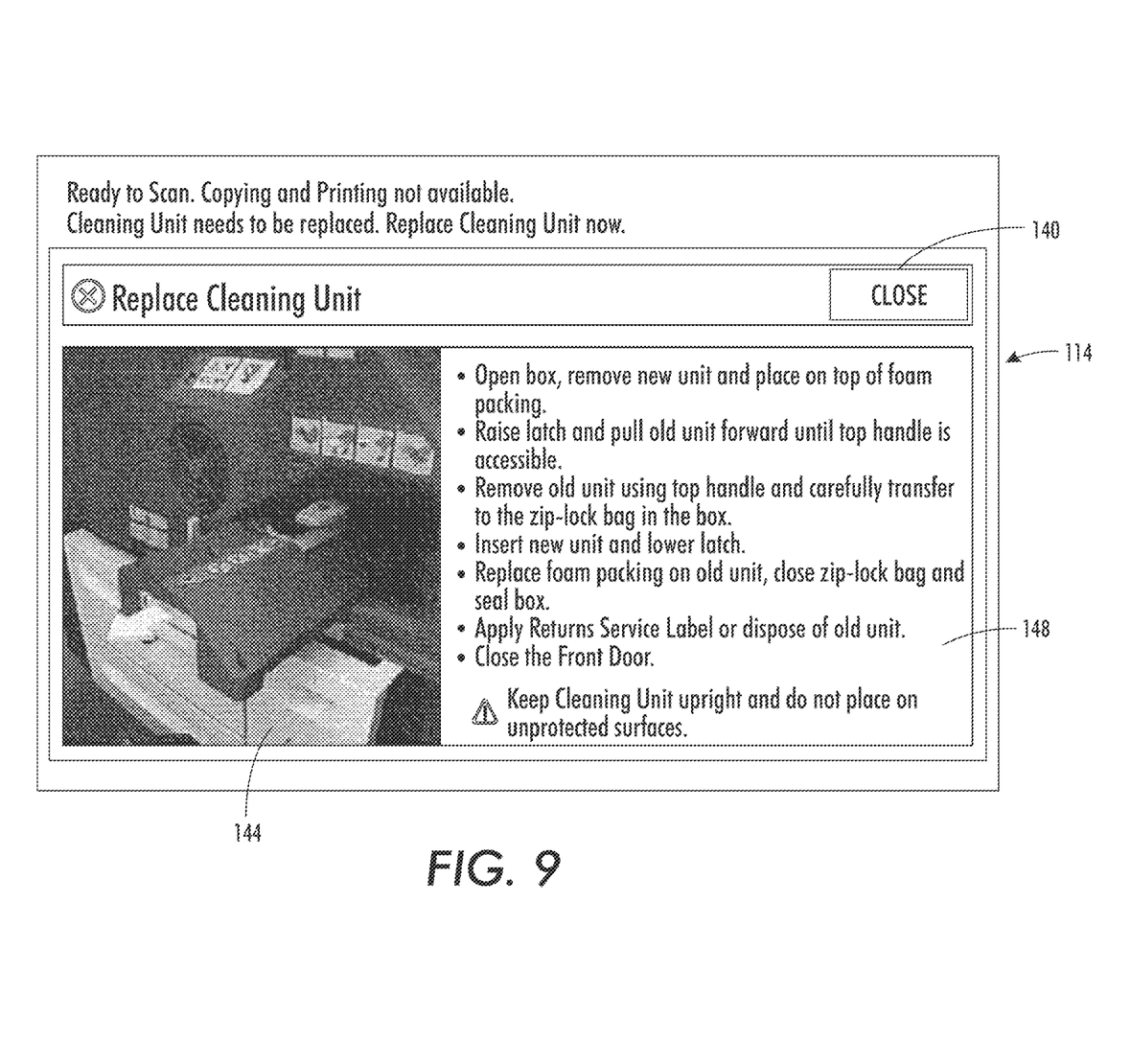
FIG. 9 shows a user interface displaying a fault frame having a 3C graphics window for displaying a CGI instruction and an accompanying text window.

Turning now to FIG. 9, an embodiment of a user interface display screen 114 is shown. In one embodiment, fault clearance instructions are displayed on the display screen in a fault frame 140 that may appear over existing user interface dialogue when a fault occurs. As depicted in FIG. 9, the fault frame 140 includes a 3D graphics window 144 for displaying a CGI instruction sequence. The selection of CGI instructions to be played in the graphics window 140 may be made automatically by the fault controller 104 in response to the detection of a fault or impending fault condition or may be made in response to a user request via the user interface 86 (FIG. 1). The fault frame 140 may include controls (not shown) configured to provide a user with the capability to control the display of the instruction such as by stopping, pausing, fast forwarding, rewinding, etc. The fault frame may also include a text window 148 for displaying a second level of instruction in the form of instructional text. For example, as seen in FIG. 9, an enumerated list of fault clearance steps that correspond to the actions being depicted in the graphics window may be provided in the text window 148. In the exemplary fault frame of FIG. 9, the CGI instruction depicted is a drum maintenance unit (i.e., cleaning unit) replacement instruction. The still image of the instruction depicted in the graphics window 144 shows the removal of the old unit from the device.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method of providing instructions to a user of an imaging device, the method comprising:

generating a three-dimensional (3D) model of an imaging device in a 3D computer generated environment;

rendering a plurality of computer generated imagery (CGI) instruction sequences from the 3D model, each CGI instruction sequence depicting at least one action being performed on the imaging device in response to a fault condition of the imaging device, the CGI instruction sequence being rendered from a virtual viewpoint corresponding to a viewpoint of a user physically performing the at least one action;

storing each CGI instruction sequence in a memory of the imaging device in association with at least one fault code;

identifying a fault condition in the imaging device;

correlating the identified fault condition with a fault code;

accessing the memory to retrieve the CGI instruction sequence stored in association with the fault code correlated to the identified fault condition; and displaying on a display screen of the imaging device the identification of the fault condition in the imaging device and the CGI instruction sequence stored in association with the fault code correlated to the identified fault condition.

2. The method of claim 1, the display of the CGI instruction sequence further comprising:

providing a fault frame on the user interface display screen, the fault frame including a 3D graphics window; and displaying the CGI instruction sequence in the 3D graphics window.

3. The method of claim 2, the provision of the fault frame further comprising:

providing the fault frame with a text window in addition to the 3D graphics window; and displaying instruction text in the text window that corresponds to the CGI instruction sequence being displayed in the 3D graphics window.

4. The method of claim 1, the rendering of the CGI instruction sequence further comprising:

rendering the CGI instruction sequence from the 3D model, the CGI instruction sequence depicting at least one action being performed on the imaging device by a CGI hand.

5. A fault management system for use with an imaging device, the fault management system including:

a memory;

a plurality of computer generated imagery (CGI) instruction sequences stored in the memory in association with a fault condition, each CGI instruction sequence being rendered from a 3D model of an imaging device defined in a 3D computer generated environment and depicting at least one action being performed on the imaging device, each CGI instruction sequence being rendered from a virtual viewpoint in the 3D environment corresponding to a viewpoint of a user physically performing the corresponding action and each CGI instruction sequence comprising a plurality of computer generated frames, each frame in the plurality of frames including a rendered image of at least a portion of the 3D model of the imaging device, motion being depicted in a CGI instruction sequence by changing a position of at least one of movable component of the imaging device from frame to frame in the sequence;

a user interface display screen operably coupled to the memory and configured to display the plurality of CGI instruction sequences;

a sensor system configured to generate signals indicative of a status of the imaging device; and a fault controller operably coupled to the sensor system, the memory and the display screen, the fault controller being configured to receive the signals generated by the sensor system and to identify fault conditions in the imaging device with reference to the signals, to access the memory to retrieve the at least one CGI instruction sequence stored in the memory in association with a fault condition identified by the fault controller, and to actuate the display screen to display the at least one retrieved CGI instruction sequence.

6. The system of claim 5, motion being depicted in each CGI instruction sequence using computer generated motion blur.

7. The system of claim 6, the plurality of frames of a CGI instruction sequence being configured for display on the display screen at a predetermined frame rate.

8. The system of claim 7, the predetermined frame rate being at least 25 frames per second.

9. A method of operating an imaging device, the method comprising:
    detecting a fault condition in an imaging device; correlating the detected fault condition to a fault code;
    accessing a memory to retrieve at least one CGI instruction sequence stored in the memory in association with the fault code correlated to the detected fault condition; and
    displaying the retrieved at least one CGI instruction sequence on a display screen in response to the detection of the fault condition, each CGI instruction sequence being rendered from a 3D model of an imaging device defined in a 3D computer generated environment and depicting at least one action being performed on the imaging device, each CGI instruction sequence being rendered from a virtual viewpoint in the 3D environment corresponding to a viewpoint of a user physically performing the corresponding action.

10. The method of claim 9, the display of the CGI instruction sequence further comprising:
    providing a fault frame on the user interface display screen, the fault frame including a 3D graphics window; and
    displaying the retrieved at least one CGI instruction in the 3D graphics window.

11. The method of claim 10, the provision of the fault frame further comprising:
    providing the fault frame with a text window in addition to the 3D graphics window; and
    displaying instruction text in the text window that corresponds to the CGI instruction sequence being displayed in the 3D graphics window.

* * * * *